7441X
I. D. Kirk,
Sawing Stone.
Patented Feb. 26, 1833.
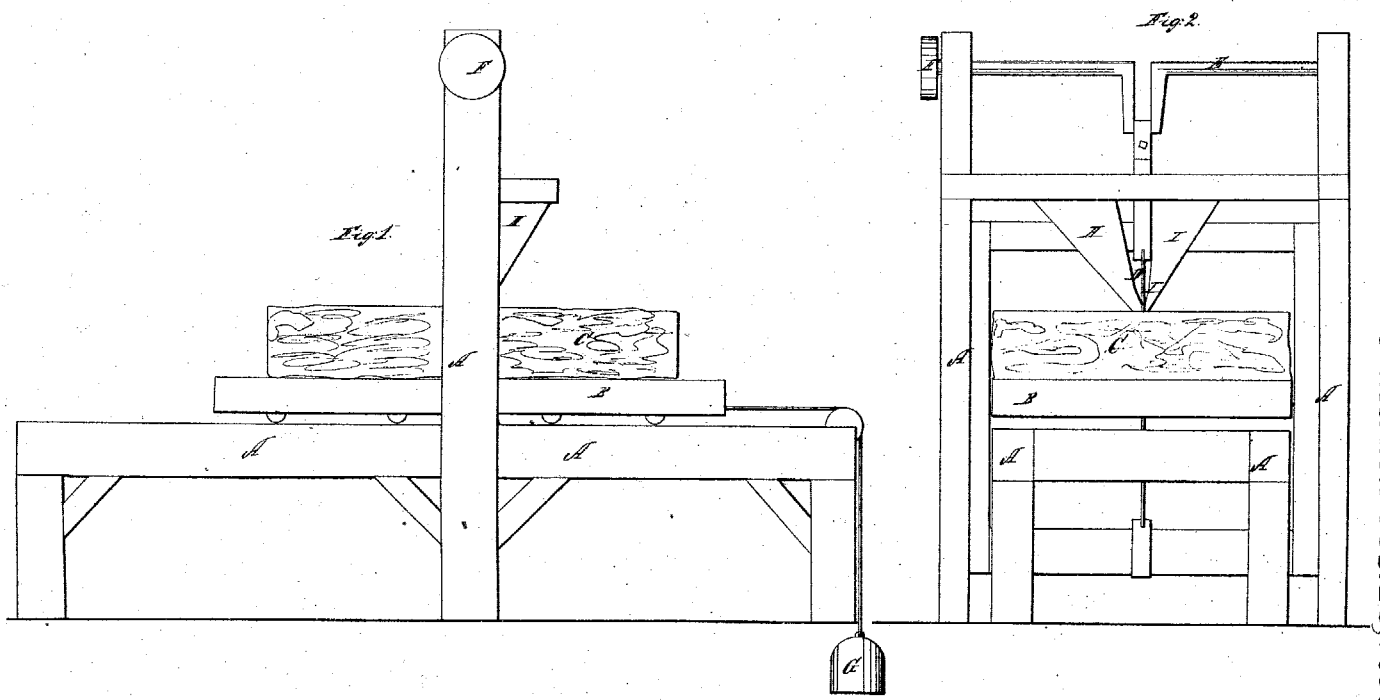
AM. PHOTO-LITHO. CO. N.Y. (OSBORNE'S PROCESS)

174 41X Feb 26 1839

Isaac D. Kirk
Letters Patent

The schedule referred to in these Letters Patent and making part of the same containing a description in the words of the said Isaac D. Kirk himself of his improvement for sawing moulding & polishing marble & other stone

---

To all whom these presents shall come. Be it known that I Isaac D. Kirk of Philadelphia and State of Pennsylvania have invented a new & useful Machine or improvement in the straight saw for sawing marble or other kinds of stone & that the following is a full & exact description of the said Machine as invented by me. I first have a frame of wood or iron of any size about the middle of this frame, I have posts standing on a level line or perpendicular at any height you may require. I then have a frame for my saws running in a groove or iron rails attached to the frame. I have a rod of iron or wood which is attached to a crank above the frame of the saw; at one end of this there is a pulley of wood for the belt to give motion to the crank & saw frames, on a horizontal line or an inclined plane. I have a rail way for a carriage to move on with weights or ratchet wheels, which has the marble on and moves up to the saws. over the marble there is a hopper with sand and water with conductors to lead to the saws on the top of the stone and runs directly into the saw kerf. the saws moving up and down by the rod attached to the crank or may be worked by a rack and cog wheel. These saws may be made of iron, brass or copper, or a composition of metal. I prefer copper for the saws. For moulding the same principle as the sawing, for polishing I have the buff placed in the place of the saw and moves by the same principle as above. These machines may be worked by hand, horse, water, or steam power Witnesses Jno. M Cannon }
Wm Kirk }

Isaac D. Kirk

Cor[illegible]
[illegible]

4 Cle [illegible]